(12) United States Patent
Li et al.

(10) Patent No.: US 12,371,571 B2
(45) Date of Patent: Jul. 29, 2025

(54) METHODS FOR FORMING AND USES OF TITANIA-COATED INORGANIC PARTICLES

(71) Applicant: AGENCY FOR SCIENCE, TECHNOLOGY AND RESEARCH, Singapore (SG)

(72) Inventors: Xu Li, Singapore (SG); Yu Zhang, Singapore (SG); Ming Yan Tan, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 0 days.

(21) Appl. No.: 18/663,173

(22) Filed: May 14, 2024

(65) Prior Publication Data

US 2024/0301212 A1    Sep. 12, 2024

Related U.S. Application Data

(62) Division of application No. 17/420,262, filed as application No. PCT/SG2020/050028 on Jan. 21, 2020, now Pat. No. 12,018,160.

(30) Foreign Application Priority Data

Jan. 21, 2019    (SG) .......................... 10201900537X

(51) Int. Cl.
  *C09C 3/00*    (2006.01)
  *A01N 25/12*    (2006.01)
  (Continued)

(52) U.S. Cl.
  CPC .............. *C09C 3/063* (2013.01); *A01N 25/12* (2013.01); *A01N 59/00* (2013.01); *A01P 1/00* (2021.08);
  (Continued)

(58) Field of Classification Search
  None
  See application file for complete search history.

(56) References Cited

U.S. PATENT DOCUMENTS 5,985,466 A    11/1999    Atarashi et al.
2008/0207581 A1*    8/2008    Whiteford ................ C09D 5/14
            514/183

FOREIGN PATENT DOCUMENTS

CN    101543780 A    9/2009
CN    108077308 A    5/2018
    (Continued)

OTHER PUBLICATIONS

Ocana et al, Preparation and Properties of Uniform Coated Colloidal Particles, 6. Titania on Zinc Oxide, Langmuir, 7, pp. 2911-2916 Year: 1991.
(Continued)

*Primary Examiner* — Stefanie J Cohen
(74) *Attorney, Agent, or Firm* — Marshall, Gerstein & Borun LLP

(57) ABSTRACT

A method of forming a titania-coated inorganic particle comprising the steps of: (a) agitating a mixture of inorganic particle and organic solvent; (b) adding titania precursor dropwise into the mixture of step (a) under agitation; and (c) adding catalyst to the mixture of step (b) thereby converting said titania precursor to titania which then forms a coating on said inorganic particle; wherein steps (a) to (c) are performed at neutral pH and ambient temperature.

2 Claims, 4 Drawing Sheets

(51) Int. Cl.
| | |
|---|---|
| A01N 59/00 | (2006.01) |
| A01P 1/00 | (2006.01) |
| B01J 21/06 | (2006.01) |
| B01J 21/08 | (2006.01) |
| B01J 35/39 | (2024.01) |
| C03C 12/02 | (2006.01) |
| C03C 17/25 | (2006.01) |
| C09C 1/00 | (2006.01) |
| C09C 3/06 | (2006.01) |
| C09D 5/32 | (2006.01) |
| C09D 5/33 | (2006.01) |
| C09D 7/40 | (2018.01) |
| C09D 7/62 | (2018.01) |

(52) U.S. Cl.
CPC ............ *B01J 21/063* (2013.01); *B01J 21/08* (2013.01); *B01J 35/39* (2024.01); *C03C 12/02* (2013.01); *C03C 17/256* (2013.01); *C09C 1/0078* (2013.01); *C09D 5/004* (2013.01); *C09D 5/32* (2013.01); *C09D 7/62* (2018.01); *C09D 7/70* (2018.01); *C01P 2002/82* (2013.01); *C01P 2002/84* (2013.01); *C01P 2004/03* (2013.01); *C01P 2004/04* (2013.01); *C01P 2004/20* (2013.01); *C01P 2004/84* (2013.01); *C03C 2217/71* (2013.01); *C03C 2217/74* (2013.01); *C03C 2218/111* (2013.01); *C03C 2218/32* (2013.01)

(56) References Cited

FOREIGN PATENT DOCUMENTS

| | | |
|---|---|---|
| JP | 2013136498 A | 7/2013 |
| WO | WO-2018/034619 A1 | 2/2018 |

OTHER PUBLICATIONS

Wang et al., "Synthesis of Core-Shell $Fe_3O_4$@$SiO_2$@TiO2 Microspheres and Their Application as Recyclable Photocatalysts", International Journal of Photoenergy, vol. 2012, Apr. 18, 2012, 7 pages.

Hendrix et al., "Influence of Synthesis Conditions on the Properties of Photocatalytic Titania-silica Composites", Journal of Photochemistry & Photobiology A: Chemistry, vol. 371, 2019, pp. 25-32.

Zifang et al., "Research and Analysis of the Anti-UV Performance of Nano-TiO2 Glass Beads Composite Coating", Integrated Ferroelectrics, vol. 169, May 6, 2016, pp. 73-82.

International Search Report in International Application No. PCT/SG2020/050028 dated Mar. 12, 2020, 6 pages.

Written Opinion in SG Application No. 11202107108V dated Sep. 5, 2022, 9 pages.

\* cited by examiner

[Fig. 1]
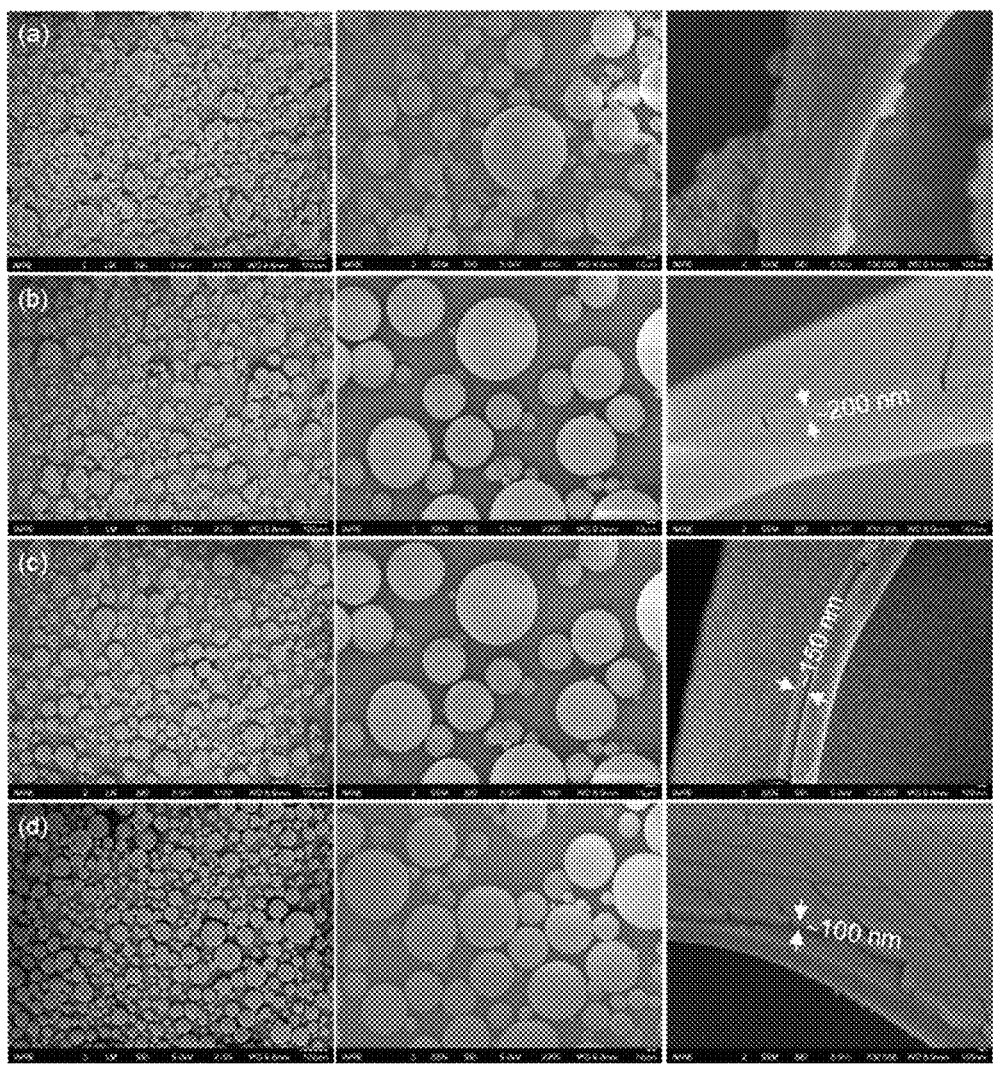

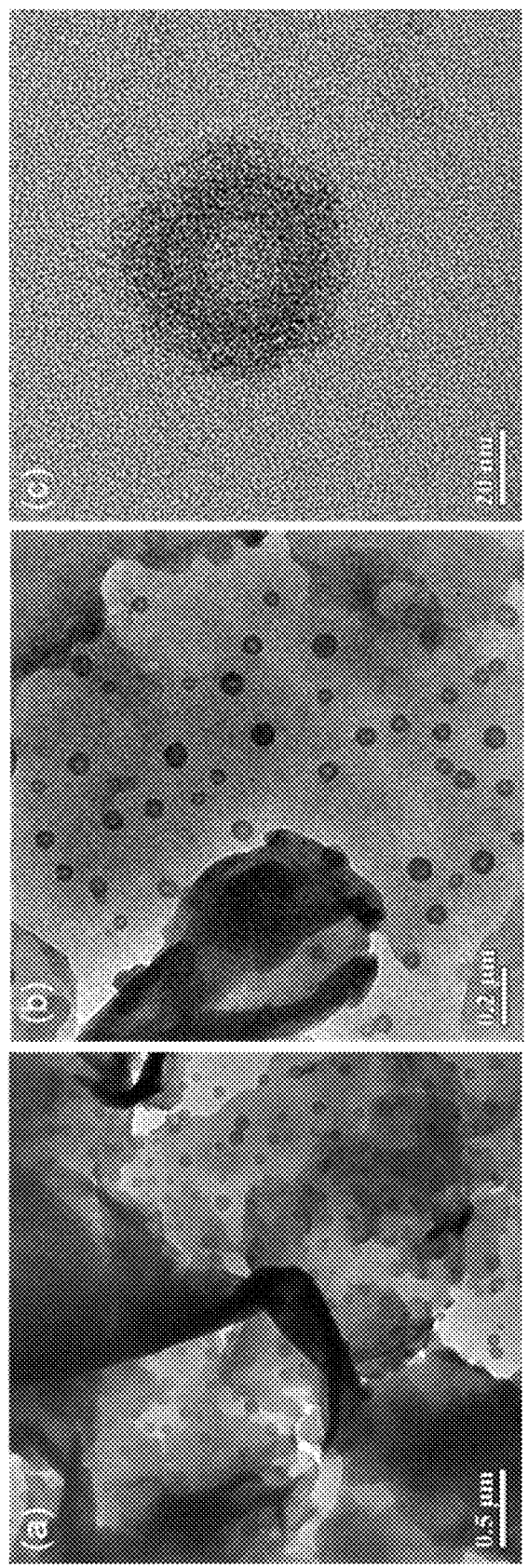
[Fig. 2]

[Fig. 3]
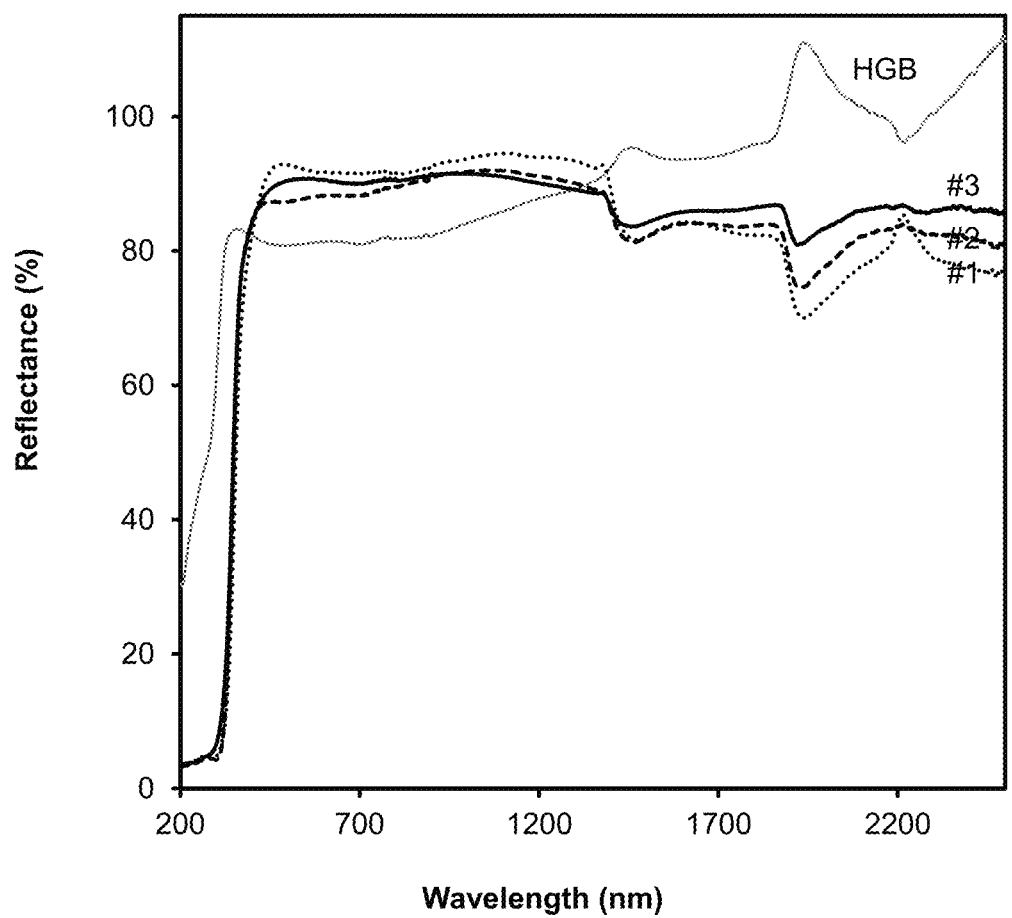

[Fig. 4]
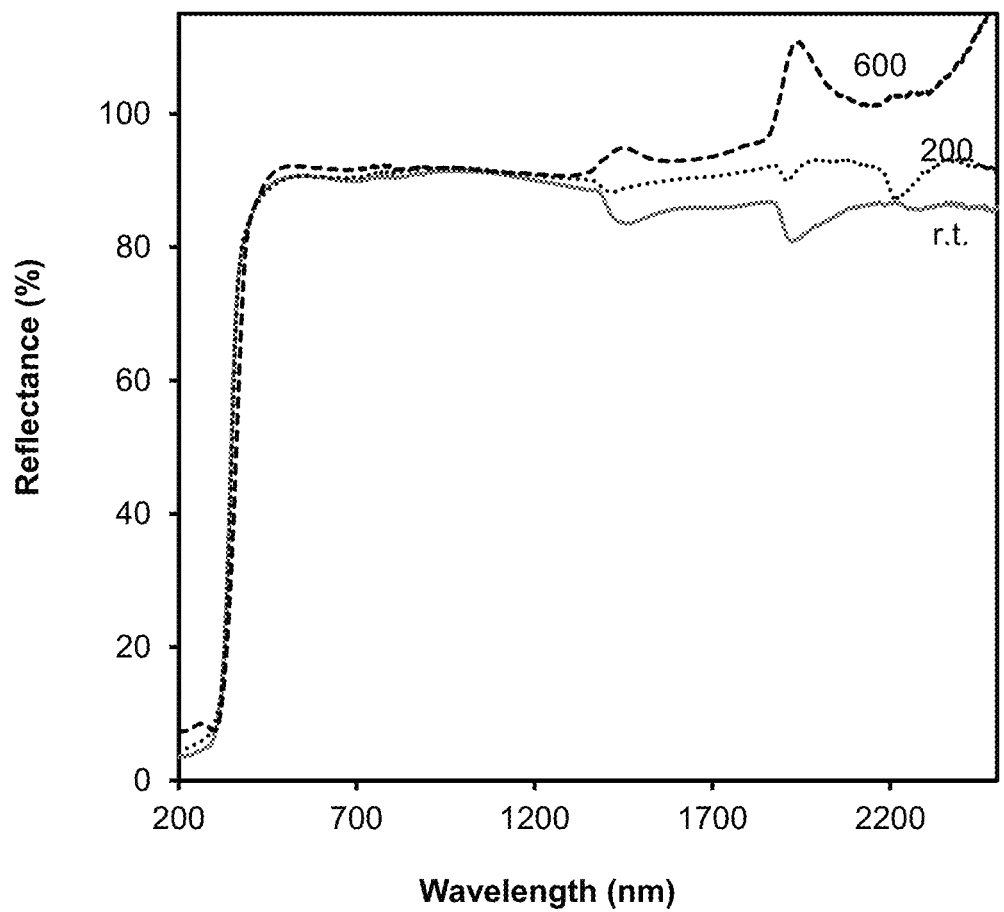

METHODS FOR FORMING AND USES OF TITANIA-COATED INORGANIC PARTICLES

CROSS-REFERENCE TO RELATED APPLICATIONS

This application is a divisional of U.S. application Ser. No. 17/420,262 filed Jul. 1, 2021, now U.S. Pat. No. 12,018,160, which is the U.S. national stage of PCT/SG2020/050028 filed Jan. 21, 2020, which claims the priority benefit of SG application 10/201900537X filed Jan. 21, 2019, the respective disclosures of which are hereby incorporated by reference in their entirety for all purposes herein.

TECHNICAL FIELD

The present invention generally relates to methods for forming titania-coated inorganic particles. The present invention also relates to the uses of the titania-coated particles formed from said methods.

BACKGROUND ART

In light of climate change and the current global energy crisis, there is a need for improved energy efficiency to reduce energy consumption, for example, by insulating a building to consume less amounts of electricity for indoor cooling. Improving energy efficiency provides one of the most effective and cheapest ways to reduce strain on our energy sources and for creating a sustainable and affordable energy system.

Some conventional thermal insulation methods employed by buildings to reduce undesirable absorption of solar radiation are: 1) using interior insulating materials, or 2) using energy storage systems. However, these methods have their disadvantages. The drawbacks from using interior insulating materials include health hazards to building occupants and smaller room sizes. As for energy storage systems, their implementation is complicated and associated with problems like leakage and corrosion. They also contain hazardous phase change materials. In contrast, using reflective coatings may be a safer and more convenient alternative. Reflective coatings are non-flammable and do not affect the integrity of the building's structure. In general, reflective coatings allow coated buildings to maintain a lower indoor temperature when exposed to solar radiation. This reduces the cooling burden on buildings during hot seasons. This in turn decreases energy consumption by air conditioning systems. Moreover, reflective coatings are able to reflect more sunlight and absorb less heat, thus mitigating the heat island effect present in urban jungles.

Hollow glass beads are a type of thermal insulation material used for reflective coatings. However, its ability to absorb infrared and visible radiation impedes its reflective performance. Metal oxide-coatings are widely used for protective, decorative and functional purposes. Titania ($TiO_2$) is an inorganic additive that features high reflectance throughout the entire solar spectrum. Its high refractive index improves the scattering of solar radiation. Thus, the addition of $TiO_2$ to hollow glass beads enhances the reflective performance of reflective coatings.

Some methods for addition of $TiO_2$ to hollow glass beads involve physical mixing of hollow glass beads and $TiO_2$. However, such physical methods generally suffer from inhomogeneity in mixing due to the large differences in density, agglomeration of $TiO_2$ particles, and low refractive index difference at the interface between hollow glass beads and binder. Other methods involve coating of $TiO_2$ onto hollow glass beads. The direct deposition of $TiO_2$ onto the surface of hollow glass beads is difficult due to the lack of affinity between hollow glass beads and $TiO_2$. As a result, surface modification of hollow glass beads is very common for improving the dispersion of hollow glass beads in the suspension and the uniformity of $TiO_2$ deposition onto the surface of hollow glass beads. Conventional surface modification methods include modifying the surface of hollow glass beads with hydroxides (for example, sodium hydroxide, potassium hydroxide and ammonium hydroxide) for surface activation. Other surface modification methods involve using urea for the growth of quasi-spherical $TiO_2$ on the surface of hollow glass beads, or using calcium hydroxide for treating the surface of hollow glass beads to increase roughness and subsequently introducing $TiCl_4$ under acidic conditions. Still other surface modification methods involve etching hollow glass beads with alkali followed by modification of the surface with a silane coupling agent. However, these methods not only involve surface modification of hollow glass beads, but also involve heating and calcination, harsh pH conditions and the use of surfactants (e.g., sodium dodecylbenzenesulfonate) for dispersion of hollow glass beads. However, the resultant $TiO_2$ coatings suffer from low uniformity and low yield which leads to high production costs.

There is therefore a need to provide a method for forming titania-coated substrates that overcomes, or at least ameliorates, one or more of the disadvantages described above.

SUMMARY OF INVENTION

In one aspect, the present disclosure refers to a method of forming a titania-coated inorganic particle comprising the steps of:
  (a) agitating a mixture of inorganic particle and organic solvent;
  (b) adding titania precursor dropwise into the mixture of step (a) under agitation; and
  (c) adding catalyst to the mixture of step (b) thereby converting said titania precursor to titania which then forms a coating on said inorganic particle;
  wherein steps (a) to (c) are performed at neutral pH and ambient temperature.

Advantageously, the disclosed methods may provide a uniform titania-coating on the surface of an inorganic particle or substrate material.

Further advantageously, the loading of titania precursors may be easily adjusted, thereby maximizing utilization of the titania precursors.

Also advantageously, the disclosed methods may produce substrates which are uniformly coated with titania. Having a highly uniform titania-coating is beneficial as it leads to an increase in the interfacial area with refractive index difference, which increases solar light reflectance. Another advantage of having a more uniform titania coating is that the interface between the titania coating and the substrate is better utilized for increasing solar light reflectance performance, photolytic antimicrobial activity or ultraviolet (UV)-shielding ability.

Further advantageously, the disclosed methods result in high yield of titania such as above 90%, which provides cost savings advantage.

Also advantageously, the thickness of the titania coating on the substrate may be easily tuned by adjusting the ratio of substrate material to metal oxide precursor in the surface reactions.

Further advantageously, the disclosed method may be undertaken at ambient conditions, such as at neutral pH and ambient temperature. This is a departure from some attempted methods which rely heavily on pH adjustment (either highly acidic or highly basic), or temperature adjustment (heating or cooling), surfactant utilization, precipitator utilization, preheating or post annealing treatment of the substrate materials to form $TiO_2$ from precursor. These controls and treatments usually result in more operation procedures and equipment usage. The disclosed methods advantageously do not require the use of any surfactant.

Also advantageously, the disclosed method is cost effective while allowing the ability to tune the uniformity and thickness of the titania-coating without any obvious freestanding $TiO_2$ agglomerates which advantageously increases the solar light reflectance property of the titania-coated substrates.

In another aspect, the present disclosure refers to a titania-coated particle produced by the methods disclosed herein.

In yet another aspect, the present disclosure refers to a use of the titania-coated particle disclosed herein in reflective coatings for thermal insulation applications, antimicrobial coatings or UV-shielding for packing applications.

Definitions

The following words and terms used herein shall have the meaning indicated:

As used herein, the term 'titania' is to be used interchangeably with titanium dioxide, or titanium (IV) oxide, and has the chemical formula $TiO_2$. Titania can exist in the amorphous form, or may be in crystalline form such as rutile, anatase, brookite, or mixtures thereof. Titania can exist as a mixture of amorphous or crystal forms, or a mixture of different amorphous forms, or a mixture of different crystal forms.

As used herein, the term "dropwise" refers to any method of incrementally adding one solution to another solution discontinuously and intermittently via discrete and/or separate aliquots.

The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means+/−5% of the stated value, more typically+/−4% of the stated value, more typically+/−3% of the stated value, more typically,+/−2% of the stated value, even more typically+/−1% of the stated value, and even more typically+/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Certain embodiments may also be described broadly and generically herein. Each of the narrower species and subgeneric groupings falling within the generic disclosure also form part of the disclosure. This includes the generic description of the embodiments with a proviso or negative limitation removing any subject matter from the genus, regardless of whether or not the excised material is specifically recited herein.

DETAILED DISCLOSURE OF EMBODIMENTS

Exemplary, non-limiting embodiments of a method for forming a titania-coated particle will now be disclosed.

There is provided a method of forming a titania-coated inorganic particle comprising the steps of:
(a) agitating a mixture of inorganic particle and organic solvent;
(b) adding titania precursor dropwise into the mixture of step (a) under agitation; and
(c) adding catalyst to the mixture of step (b) thereby converting said titania precursor to titania which then forms a coating on said inorganic particle;
wherein steps (a) to (c) are performed at neutral pH and ambient temperature.

The inventors have surprisingly found that adding the titania precursor dropwise may lead to a titania-coated particle with a highly uniform coating. Having a highly uniform coating is advantageous as it leads to an increase in the interfacial area with refractive index difference, which increases solar light reflectance. Another advantage of having a highly uniform titania coating is that the interface between the titania coating and the substrate is better utilized for increasing solar light reflectance performance, photolytic antimicrobial activity or ultraviolet (UV)-shielding ability.

The dropwise addition of precursor also surprisingly avoids any obvious freestanding $TiO_2$ agglomerates by confining the reaction to the substrate surface. This may advantageously improve the homogeneity of the metal oxide such as uniform particle size, coating thickness and chemical and physical structures of the metal oxide. This may advantageously increase the solar light reflectance property of the titania-coated substrates.

The precursor may be added dropwise at a rate between 0.1 g/min to 5.0 g/min to 100 mL of organic solvent. The rate of dropwise addition of precursor per 100 mL of organic solvent may be in the range from about 0.1 to about 5.0 (g/min), about 0.5 to about 5.0 (g/min), about 1 to about 5.0 (g/min), about 1.5 to about 5.0 (g/min), about 2 to about 5.0 (g/min), about 2.5 to about 5.0 (g/min), about 3 to about 5.0 (g/min), about 3.5 to about 5.0 (g/min), about 4 to about 5.0 (g/min), about 4.5 to about 5.0 (g/min), about 0.1 to about 4.5 (g/min), about 0.1 to about 4.0 (g/min), about 0.1 to about 3.5 (g/min), about 0.1 to about 3.0 (g/min), about 0.1 to about 2.5 (g/min), about 0.1 to about 2.0 (g/min), about 0.1 to about 1.5 (g/min), about 0.1 to about 1.0 (g/min), or about 0.1 to about 0.5 (g/min), or about 0.1 g/min, about 0.5 g/min, about 1.0 g/min, about 1.5 g/min, about 2.0 g/min, about 2.5 g/min, about 3.0 g/min, about 3.5 g/min, about 4.0 g/min, about 4.5 g/min, or about 5.0 g/min. It is to be appreciated that the above ranges should be interpreted as including and supporting any sub-ranges or discrete values (which may or may not be a whole number) that are within the stated range(s).

The volume of each droplet (or aliquot) added per 100 mL of organic solvent may be 10 μL to 50 μL. The volume of each droplet (or aliquot) added per 100 mL of organic solvent may be in the range from about 10 to about 50 (μL), about 15 to about 50 (μL), about 20 to about 50 (μL), about 25 to about 50 (μL), about 30 to about 50 (μL), about 35 to about 50 (μL), about 40 to about 50 (μL), about 45 to about 50 (μL), about 10 to about 45 (μL), about 10 to about 40 (μL), about 10 to about 35 (μL), about 10 to about 30 (μL), about 10 to about 25 (μL), about 10 to about 20 (μL), or about 10 to about 15 (μL), or about 10 μL, about 15 μL, about 20 μL, about 25 μL, about 30 μL, about 35 μL, about 40 μL, about 45 μL, or about 50 μL. It is to be appreciated that the above ranges should be interpreted as including and supporting any sub-ranges or discrete values (which may or may not be a whole number) that are within the stated range(s).

The inventors have also surprisingly found that it is beneficial to add the catalyst at predetermined time intervals, instead of adding all of the catalyst at one time. The predetermined time intervals may be regular or irregular time intervals. The regular or irregular time intervals may be at least 0.5 hours apart. By adding catalyst at predetermined time intervals, high amounts of catalyst may diffuse to the surface of the substrate which advantageously helps in reducing the formation of free-standing $TiO_2$ agglomerates. Hence, a high $TiO_2$ yield may be achieved.

The regular or irregular time intervals may be at least 0.5 hours apart, at least 1 hour apart, at least 1.5 hours apart, at least 2 hours apart, at least 2.5 hours apart, at least 3 hours apart, at least 3.5 hours apart, at least 4 hours apart, at least 4.5 hours apart, or at least 5 hours apart.

The catalyst may be added one time, two times, three times, four times, five times, six times, seven times, eight times, nine times, ten times, eleven times, twelve times, thirteen times, fourteen times, or fifteen times. When the catalyst is added more than one time, the catalyst may be added at regular or irregular time intervals.

The catalyst may be added at regular time intervals, each spaced apart by at least 0.5 hours. The catalyst may be added two times, three times, four times, five times, six times, seven times, eight times, nine times, ten times, eleven times, twelve times, thirteen times, fourteen times, or fifteen times at a time interval of at least 0.5 hours apart. The catalyst may be added two times, three times, four times, five times, six times, seven times, eight times, nine times, ten times, eleven times, twelve times, thirteen times, fourteen times, or fifteen times at a time interval of at least 1 hour apart. The catalyst may be added two times, three times, four times, five times, six times, seven times, eight times, nine times, ten times, eleven times, twelve times, thirteen times, fourteen times, or fifteen times at a time interval of at least 1.5 hours apart. The catalyst may be added two times, three times, four times, five times, six times, seven times, eight times, nine times, ten times, eleven times, twelve times, thirteen times, fourteen times, or fifteen times at a time interval of at least 2 hours apart. The catalyst may be added two times, three times, four times, five times, six times, seven times, eight times, nine times, ten times, eleven times, twelve times, thirteen times, fourteen times, or fifteen times at a time interval of at least 2.5 hours apart. The catalyst may be added two times, three times, four times, five times, six times, seven times, eight times, nine times, ten times, eleven times, twelve times, thirteen times, fourteen times, or fifteen times at a time interval of at least 3 hours apart. The catalyst may be added two times, three times, four times, five times, six times, seven times, eight times, nine times, ten times, eleven times, twelve times, thirteen times, fourteen times, or fifteen times at a time interval of at least 3.5 hours apart. The catalyst may be added two times, three times, four times, five times, six times, seven times, eight times, nine times, ten times, eleven times, twelve times, thirteen times, fourteen times, or fifteen times at a time interval of at least 4 hours apart. The catalyst may be added two times, three times, four times, five times, six times, seven times, eight times, nine times, ten times, eleven times, twelve times, thirteen times, fourteen times, or fifteen times at a time interval of at least 4.5 hours apart. The catalyst may be added two times, three times, four times, five times, six times, seven times, eight times, nine times, ten times, eleven times, twelve times, thirteen times, fourteen times, or fifteen times at a time interval of at least 5 hours apart.

The catalyst may be added at irregular time intervals, each spaced apart by at least 0.5 hours. The time interval between the first and second additions may be a long time interval (for example at least 2 or 3 hours apart), and the time interval between the second and third additions (and further additions if present) may be shorter time intervals. For example, the time interval between the first and second additions of catalyst may be 3 hours, and the time interval between the second and third additions (and further additions if present) of catalyst may be 0.5 hours, 1 hour, 1.5 hours, or 2 hours. In another example, the time interval between the first and second additions of catalyst may be 3 hours, the time interval between the second and third additions of catalyst may be 2 hours, the time interval between the third and fourth additions of catalyst may be 2 hours, and the time interval between the fourth and fifth additions of catalyst may be 0.5 hours. In another example, the time interval between the first and second additions of catalyst may be 3 hours, the time interval between the second and third additions of catalyst may be 1 hour, the time interval between the third and fourth additions of catalyst may be 1 hour, and the time interval between the fourth and fifth additions of catalyst may be 0.5 hours. In yet another example, the time interval between the first and second additions of catalyst may be 3 hours, the time interval between the second and third additions of catalyst may be 0.5 hours, the time interval between the third and fourth additions of catalyst may be 0.5 hours, and the time interval between the fourth and fifth additions of catalyst may be 0.5 hours. In a further example, the time interval between the first and second additions of catalyst may be 3 hours, the time interval between the second and third additions of catalyst may be 2 hours, the time interval between the third and fourth additions of catalyst may be 1 hour, and the time interval between the fourth and fifth additions of catalyst may be 0.5 hours.

The mass ratio of the inorganic particle to organic solvent may be in the range from about 0.02:1 to about 0.1:1 (g/g), about 0.03:1 to about 0.1:1 (g/g), about 0.04:1 to about 0.1:1 (g/g), about 0.05:1 to about 0.1:1 (g/g), about 0.06:1 to about 0.1:1 (g/g), about 0.07:1 to about 0.1:1 (g/g), about 0.08:1 to about 0.1:1 (g/g), or about 0.09:1 to about 0.1:1 (g/g), about 0.02:1 to about 0.09:1 (g/g), about 0.02:1 to about 0.08:1 (g/g), about 0.02:1 to about 0.07:1 (g/g), about 0.02:1 to about 0.06:1 (g/g), about 0.02:1 to about 0.05:1 (g/g), about 0.02:1 to about 0.04:1 (g/g), about 0.02:1 to about 0.03:1 (g/g), or about 0.02:1 (g/g), about 0.03:1 (g/g), about 0.04:1 (g/g), about 0.05:1 (g/g), about 0.06:1 (g/g), about 0.07:1 (g/g), about 0.08:1 (g/g), about 0.09:1 (g/g), or about 0.1:1 (g/g). It is to be appreciated that the above ranges should be interpreted as including and supporting any sub-ranges or discrete values (which may or may not be a whole number) that are within the stated range(s).

The mass ratio of the titania precursor to organic solvent may be in the range from about 0.01:1 to about 0.12:1 (g/g), about 0.02:1 to about 0.12:1 (g/g), about 0.03:1 to about 0.12:1 (g/g), about 0.04:1 to about 0.12:1 (g/g), about 0.05:1 to about 0.12:1 (g/g), about 0.06:1 to about 0.12:1 (g/g), about 0.07:1 to about 0.12:1 (g/g), about 0.08:1 to about 0.12:1 (g/g), about 0.09:1 to about 0.12:1 (g/g), about 0.10:1 to about 0.12:1 (g/g), about 0.11:1 to about 0.12:1 (g/g), about 0.01:1 to about 0.11:1 (g/g), about 0.01:1 to about 0.10:1 (g/g), about 0.01:1 to about 0.09:1 (g/g), about 0.01:1 to about 0.08:1 (g/g), about 0.01:1 to about 0.07:1 (g/g), about 0.01:1 to about 0.06:1 (g/g), about 0.01:1 to about 0.05:1 (g/g), about 0.01:1 to about 0.04:1 (g/g), about 0.01:1 to about 0.03:1 (g/g), about 0.01:1 to about 0.02:1 (g/g), or about 0.01:1 (g/g), about 0.02:1 (g/g), about 0.03:1 (g/g), about 0.04:1 (g/g), about 0.05:1 (g/g), about 0.06:1 (g/g), about 0.07:1 (g/g), about 0.08:1 (g/g), about 0.09:1 (g/g), about 0.10:1 (g/g), about 0.11:1 (g/g), or about 0.12:1 (g/g). It is to be appreciated that the above ranges should be interpreted as including and supporting any sub-ranges or discrete values (which may or may not be a whole number) that are within the stated range(s).

The mass ratio of the cumulative or total amount of catalyst added over predetermined time intervals to organic solvent may be in the range from about 0.006:1 to about 0.1:1 (g/g), about 0.007:1 to about 0.1:1 (g/g), about 0.008:1 to about 0.1:1 (g/g), about 0.009:1 to about 0.1:1 (g/g), about 0.01:1 to about 0.1:1 (g/g), about 0.02:1 to about 0.1:1 (g/g), about 0.03:1 to about 0.1:1 (g/g), about 0.04:1 to about 0.1:1 (g/g), about 0.05:1 to about 0.1:1 (g/g), about 0.06:1 to about 0.1:1 (g/g), about 0.07:1 to about 0.1:1 (g/g), about 0.08:1 to about 0.1:1 (g/g), or about 0.09:1 to about 0.1:1 (g/g), about 0.006:1 to about 0.09:1 (g/g), about 0.006:1 to about 0.08:1 (g/g), about 0.006:1 to about 0.07:1 (g/g), about 0.006:1 to about 0.06:1 (g/g), about 0.006:1 to about 0.05:1 (g/g), about 0.006:1 to about 0.04:1 (g/g), about 0.006:1 to about 0.03:1 (g/g), about 0.006:1 to about 0.02:1 (g/g), about 0.006:1 to about 0.01:1 (g/g), about 0.006:1 to about 0.009:1 (g/g), about 0.006:1 to about 0.008:1 (g/g), about 0.006:1 to about 0.007:1 (g/g), or about 0.006:1 (g/g), about 0.007:1 (g/g), about 0.008:1 (g/g), about 0.009:1 (g/g) about 0.01:1 (g/g), about 0.02:1 (g/g), about 0.03:1 (g/g), about 0.04:1 (g/g), about 0.05:1 (g/g), about 0.06:1 (g/g), about 0.07:1 (g/g), about 0.08:1 (g/g), about 0.09:1 (g/g), or about 0.1:1 (g/g). It is to be appreciated that the above ranges should be interpreted as including and supporting any sub-ranges or discrete values (which may or may not be a whole number) that are within the stated range(s).

The mass ratio of titania precursor to inorganic particle may be in the range from about 0.3:1 to about 2.5:1 (g/g), about 0.4:1 to about 2.5:1 (g/g), about 0.5:1 to about 2.5:1 (g/g), about 0.6:1 to about 2.5:1 (g/g), about 0.7:1 to about 2.5:1 (g/g), about 0.8:1 to about 2.5:1 (g/g), about 0.9:1 to about 2.5:1 (g/g), about 1.0:1 to about 2.5:1 (g/g), about 1.1:1 to about 2.5:1 (g/g), about 1.2:1 to about 2.5:1 (g/g), about 1.3:1 to about 2.5:1 (g/g), about 1.4:1 to about 2.5:1 (g/g), about 1.5:1 to about 2.5:1 (g/g), about 1.6:1 to about 2.5:1 (g/g), about 1.7:1 to about 2.5:1 (g/g), about 1.8:1 to about 2.5:1 (g/g), about 1.9:1 to about 2.5:1 (g/g), about 2.0:1 to about 2.5:1 (g/g), about 2.1:1 to about 2.5:1 (g/g), about 2.2:1 to about 2.5:1 (g/g), about 2.3:1 to about 2.5:1 (g/g), about 2.4:1 to about 2.5:1 (g/g), about 0.3:1 to about 2.4:1 (g/g), about 0.3:1 to about 2.3:1 (g/g), about 0.3:1 to about 2.2:1 (g/g), about 0.3:1 to about 2.1:1 (g/g), about 0.3:1 to about 2.0:1 (g/g), about 0.3:1 to about 1.9:1 (g/g), about 0.3:1 to about 1.8:1 (g/g), about 0.3:1 to about 1.7:1 (g/g), about 0.3:1 to about 1.6:1 (g/g), about 0.3:1 to about 1.5:1 (g/g), about 0.3:1 to about 1.4:1 (g/g), about 0.3:1 to about 1.3:1 (g/g), about 0.3:1 to about 1.2:1 (g/g), about 0.3:1 to about 1.1:1 (g/g), about 0.3:1 to about 1.0:1 (g/g), about 0.3:1 to about 0.9:1 (g/g), about 0.3:1 to about 0.8:1 (g/g), about 0.3:1 to about 0.7:1 (g/g), about 0.3:1 to about 0.6:1 (g/g), about 0.3:1 to about 0.5:1 (g/g), about 0.3:1 to about 0.4:1 (g/g), or about 0.3:1 (g/g), about 0.4:1 (g/g), about 0.5:1 (g/g), about 0.6:1 (g/g), about 0.7:1 (g/g), about 0.8:1 (g/g), about 0.9:1 (g/g), about 1.0:1 (g/g), about 1.1:1 (g/g), about 1.2:1 (g/g), about 1.3:1 (g/g), about 1.4:1 (g/g), about 1.5:1 (g/g), about 1.6:1 (g/g), about 1.7:1 (g/g), about 1.8:1 (g/g), about 1.9:1 (g/g), about 2.0:1 (g/g), about 2.1:1 (g/g), about 2.2:1 (g/g), about 2.3:1 (g/g), about 2.4:1 (g/g), or about 2.5:1 (g/g). It is to be appreciated that the above ranges should be interpreted as including and supporting any sub-ranges or discrete values (which may or may not be a whole number) that are within the stated range(s).

In another embodiment, the ratio of titania precursor to inorganic particle may be in the range from about 1:1 to about 7:1 (mmol/g), about 2:1 to about 7:1 (mmol/g), about 3:1 to about 7:1 (mmol/g), about 4:1 to about 7:1 (mmol/g), about 5:1 to about 7:1 (mmol/g), or about 6:1 to about 7:1 (mmol/g), about 1:1 to about 6:1 (mmol/g), about 1:1 to about 5:1 (mmol/g), about 1:1 to about 4:1 (mmol/g), about 1:1 to about 3:1 (mmol/g), about 1:1 to about 2:1 (mmol/g), or about 1:1 (mmol/g), about 2:1 (mmol/g), about 3:1 (mmol/g), about 4:1 (mmol/g), about 5:1 (mmol/g), about 6:1 (mmol/g), or about 7:1 (mmol/g). It is to be appreciated that the above ranges should be interpreted as including and supporting any sub-ranges or discrete values (which may or may not be a whole number) that are within the stated range(s).

The mass ratio of catalyst to titania precursor may be in the range from about 0.40:1 to about 0.85:1 (g/g), about 0.45:1 to about 0.85:1 (g/g), about 0.50:1 to about 0.85:1 (g/g), about 0.55:1 to about 0.85:1 (g/g), about 0.60:1 to about 0.85:1 (g/g), about 0.65:1 to about 0.85:1 (g/g), about 0.70:1 to about 0.85:1 (g/g), about 0.75:1 to about 0.85:1 (g/g), about 0.80:1 to about 0.85:1 (g/g), about 0.40:1 to about 0.80:1 (g/g), about 0.40:1 to about 0.75:1 (g/g), about 0.40:1 to about 0.70:1 (g/g), about 0.40:1 to about 0.65:1 (g/g), about 0.40:1 to about 0.60:1 (g/g), about 0.40:1 to about 0.55:1 (g/g), about 0.40:1 to about 0.50:1 (g/g), about 0.40:1 to about 0.45:1 (g/g), or about 0.40:1 (g/g), about 0.45:1 (g/g), about 0.50:1 (g/g), about 0.55:1 (g/g), about 0.60:1 (g/g), about 0.65:1 (g/g), about 0.70:1 (g/g), about 0.75:1 (g/g), about 0.80:1 (g/g), or about 0.85:1 (g/g). It is to be appreciated that the above ranges should be interpreted as including and supporting any sub-ranges or discrete values (which may or may not be a whole number) that are within the stated range(s).

In another embodiment, the ratio of catalyst to titania precursor may be in the range from about 9:1 to about 16:1 (mol/mol), about 10:1 to about 16:1 (mol/mol), about 11:1 to about 16:1 (mol/mol), about 12:1 to about 16:1 (mol/mol), about 13:1 to about 16:1 (mol/mol), about 14:1 to about 16:1 (mol/mol), or about 15:1 to about 16:1 (mol/mol), about 9:1 to about 15:1 (mol/mol), about 9:1 to about 14:1 (mol/mol), about 9:1 to about 13:1 (mol/mol), about 9:1 to about 12:1 (mol/mol), about 9:1 to about 11:1 (mol/mol), about 9:1 to about 10:1 (mol/mol), or about 9:1 (mol/mol), about 10:1 (mol/mol), about 11:1 (mol/mol), about 12:1 (mol/mol), about 13:1 (mol/mol), about 14:1 (mol/mol), about 15:1 (mol/mol), or about 16:1 (mol/mol). It is to be appreciated that the above ranges should be interpreted as including and supporting any sub-ranges or discrete values (which may or may not be a whole number) that are within the stated range(s).

The titania precursor may be a titania alkoxide. The titania alkoxide may be selected from the group comprising of titania methoxides, ethoxides, n-propoxides, iso-propoxides, n-butoxides, sec-butoxides, tert-butoxides, and mixtures thereof.

The inorganic particle may be any inorganic substrate. The inorganic substrate may be selected from the group comprising of hollow glass beads, silicate platelets, silica glass particles, borosilicate glass particles, aluminosilicate glass particles, and mixtures thereof. The inorganic particle may be of any shape, such as a spherical particle with curved surface or a sheet with flat surface. The inorganic particle may be a nanosphere, a microsphere or a sheet, having a diameter (or equivalent diameter if the inorganic particle is not an exact sphere) that is not particularly limited. The diameter (or equivalent diameter) may be in the range of about 1 nanometer to about 1000 micrometers, about 1 nanometer to about 100 nanometers, about 100 nanometers to about 1 micrometer, about 1 micrometer to about 100 micrometers, about 50 micrometers to about 100 micrometers, or about 100 micrometers to about 200 micrometers.

The organic solvent is one that is not particularly limited as long as it is miscible with an aqueous solution (such as water) and allow for good dispersion with the inorganic particles (be it hydrophobic or hydrophilic inorganic particles). The organic solvent may be selected from the group consisting of alcohols, ketones, ethers, and mixtures thereof. An exemplary alcohol organic solvent may be ethanol, benzyl alcohol, 1,4-butanediol, 1,2,4-butanetriol, butanol, 2-butanol, n-butanol, tert-butyl alcohol, denatured alcohol, 2-ethylhexanol, isobutanol, methanol, 2-(2-methoxyethoxy) ethanol, 2-methyl-1-butanol, 2-methyl-1-pentanol, 3-methyl-2-butanol, neopentyl alcohol, 1,3-propanediol, 1-propanol, 2-propanol, 1-heptanol, 1-hexanol, 1-octanol, 1-pentanol, 2-pentanol, 3-pentanol or isopropanol. Exemplary ketone organic solvents may be acetone, methyl ethyl ketone, methyl isobutyl ketone, methyl n-amyl ketone, cyclohexane, diisobutyl ketone, diacetone alcohol or isophorone. Exemplary ether organic solvents may be dimethyl ether, tetrahydrofuran, methyl tert-butyl ether or dioxane.

The catalyst may be water selected from the group comprising of tap water, distilled water and deionized water.

In one embodiment, the inorganic particles may be added to the organic solvent first to form a first mixture, followed by the addition of the titania precursor dropwise to form a second mixture. The resultant second mixture may be agitated for at least 5 minutes, at least 0.5 hours, at least 1 hour, at least 2 hours, at least 3 hours, or at least 4 hours. The resultant mixture may be agitated at any speed that can ensure good mixing of the suspension.

Exemplary agitation speeds for mixing solid inorganic particles with organic solvent may be above 300 rpm, above 400 rpm, above 500 rpm, above 600 rpm, above 700 rpm, above 800 rpm, above 900 rpm, or above 1000 rpm. It is to be appreciated that the above ranges should be interpreted as including and supporting any sub-ranges or discrete values (which may or may not be a whole number) that are within the stated range(s).

Exemplary agitation speeds for mixing hollow inorganic particles with organic solvent may be in the range from about 200 rpm to about 300 rpm, about 225 rpm to about 300 rpm, about 250 rpm to about 300 rpm, about 275 rpm to about 300 rpm, about 200 rpm to about 275 rpm, about 200 rpm to about 250 rpm, about 200 rpm to about 225 rpm, or about 200 rpm, about 225 rpm, about 250 rpm, about 275 rpm, or about 300 rpm. These ranges of agitation speed for hollow inorganic particles can avoid breakage of the hollow inorganic particles. It is to be appreciated that the above ranges should be interpreted as including and supporting any sub-ranges or discrete values (which may or may not be a whole number) that are within the stated range(s).

After agitating (step (b)), catalyst is added to the mixture (or suspension mixture). The catalyst may be added once or more than once at predetermined time intervals, which may be regular or irregular. The addition of catalyst in step (c) may be undertaken at time intervals of at least 0.5 hours apart, at least 1 hour apart, at least 1.5 hours apart, at least 2 hours apart, at least 2.5 hours apart, at least 3 hours apart, at least 3.5 hours apart, at least 4 hours apart, at least 4.5 hours apart, or at least 5 hours apart. Adding the catalyst at predetermined time intervals may advantageously control the quantity of catalyst added which is for controlling the growth and dispersion of $TiO_2$ on the substrate surface.

The method may be undertaken at neutral pH. The method may not require explicit control of the pH or addition of pH adjusting agents such as acid or base. The method may be conducted at the pH of the reaction system which is neutral without involving any pH adjustment or neutralizing agent. The pH of the reaction system may be in the range from about 6 to about 9, about 6.5 to about 9, about 7 to about 9, about 7.5 to about 9, about 8 to about 9, about 8.5 to about 9, about 6 to about 8.5, about 6 to about 8, about 6 to about 7.5, about 6 to about 7, about 6 to about 6.5, or about 6, about 6.5, about 7, about 7.5, about 8, about 8.5, or about 9. It is to be appreciated that the above ranges should be interpreted as including and supporting any sub-ranges or discrete values (which may or may not be a whole number) that are within the stated range(s).

The method may be undertaken at ambient temperature without any temperature adjustment, such as at room temperature (for example, about 20° C. to about 30° C.). The ambient temperature may be in the range from about 20° C. to about 30° C., about 21° C. to about 30° C., about 22° C. to about 30° C., about 23° C. to about 30° C., about 24° C. to about 30° C., about 25° C. to about 30° C., about 26° C. to about 30° C., about 27° C. to about 30° C., about 28° C. to about 30° C., about 29° C. to about 30° C., about 20° C. to about 30° C., about 20° C. to about 29° C., about 20° C. to about 28° C., about 20° C. to about 27° C., about 20° C. to about 26° C., about 20° C. to about 25° C., about 20° C. to about 24° C., about 20° C. to about 23° C., about 20° C. to about 22° C., about 20° C. to about 21° C., or about 20° C., about 21° C., about 22° C., about 23° C., about 24° C., about 25° C., about 26° C., about 27° C., about 28° C., about 29° C., or about 30° C. It is to be appreciated that the above ranges should be interpreted as including and supporting any sub-ranges or discrete values (which may or may not be a whole number) that are within the stated range(s). The method may thus not require any additional heating or cooling steps in order to control the temperature.

The method may further comprise the step of separating the $TiO_2$-coated inorganic particle from the (suspension) mixture. The filtered particle may be subjected to a washing step with water or an alcohol to remove any excess $TiO_2$ precursor. The composite formed may be extracted from the final solution, such as by filtering, and stored for future use.

The method may further comprise the step of d. annealing the $TiO_2$-coated inorganic particle (that is filtered and/or washed) at about 200-1000° C. for around 2 hours, at a heating rate of 1° C. $min^{-1}$, to adjust the crystalline phase and crystallinity of the metal oxide-coating. The annealing temperature may be about 200° C. to about 1000° C., about 250° C. to about 1000° C., about 300° C. to about 1000° C., about 350° C. to about 1000° C., about 400° C. to about 1000° C., about 450° C. to about 1000° C., about 500° C. to about 1000° C., about 550° C. to about 1000° C., about 600° C. to about 1000° C., about 650° C. to about 1000° C., about 700° C. to about 1000° C., about 750° C. to about 1000° C., about 800° C. to about 1000° C., about 850° C. to about 1000° C., about 900° C. to about 1000° C., about 950° C. to about 1000° C., about 200° C. to about 950° C., about 200° C. to about 900° C., about 200° C. to about 850° C., about 200° C. to about 800° C., about 200° C. to about 750° C., about 200° C. to about 700° C., about 200° C. to about 650° C., about 200° C. to about 600° C., about 200° C. to about 550° C., about 200° C. to about 500° C., about 200° C. to about 450° C., about 200° C. to about 400° C., about 200° C. to about 350° C., about 200° C. to about 300° C., about 200° C. to about 250° C., or about 200° C., about 250° C., about 300° C., about 350° C., about 400° C., about 450° C., about 500° C., about 550° C., about 600° C., about 650° C., about 700° C., about 750° C., about 800° C., about 850° C., about 900° C., about 950° C., or about 1000° C. It is to be appreciated that the above ranges should be interpreted as including and supporting any sub-ranges or discrete values (which may or may not be a whole number) that are within the stated range(s).

The disclosed method may provide a yield of titania which is above 90%, above 91%, above 92%, above 93%, above 94%, above 95%, above 96%, above 97%, above 98%, or above 99%. It is to be appreciated that the above ranges should be interpreted as including and supporting any sub-ranges or discrete values (which may or may not be a whole number) that are within the stated range(s).

The disclosed method may form a $TiO_2$-coated inorganic particle having a $TiO_2$-coating thickness of about 20 nm to about 500 nm, about 50 nm to about 500 nm, about 100 nm to about 500 nm, about 150 nm to about 500 nm, about 200 nm to about 500 nm, about 250 nm to about 500 nm, about 300 nm to about 500 nm, about 350 nm to about 500 nm, about 400 nm to about 500 nm, about 450 nm to about 500 nm, about 20 nm to about 450 nm, about 20 nm to about 400 nm, about 20 nm to about 350 nm, about 20 nm to about 300 nm, about 20 nm to about 250 nm, about 20 nm to about 200 nm, about 20 nm to about 150 nm, about 20 nm to about 100 nm, about 20 nm to about 50 nm, or about 20 nm, about 50 nm, about 100 nm, about 150 nm, about 200 nm, about 250 nm, about 300 nm, about 350 nm, about 400 nm, about 450 nm, or about 500 nm. It is to be appreciated that the above ranges should be interpreted as including and supporting any sub-ranges or discrete values (which may or may not be a whole number) that are within the stated range(s). The shell thickness of the $TiO_2$-coated inorganic particle may be tuned or controlled by the disclosed method by controlling the ratio of the inorganic particle to $TiO_2$ precursor.

There is also provided a titania-coated particle produced by the method as disclosed herein.

There is also provided a use of the titania-coated particle as disclosed herein in reflective coatings for thermal insulation applications, antimicrobial coatings or UV-shielding for packing applications.

Through controllable surface reactions, $TiO_2$ particles may be uniformly dispersed on the surface of silicate platelets. There may be no need to make any surface modification of silicate substrates prior to coating. The disclosed methods may overcome the agglomeration problem of nanoscale $TiO_2$ when dispersed in the matrix materials, where nanoscale $TiO_2$ is typically prone to aggregate due to the large surface area and high surface energy of nanoparticles. Additionally, $TiO_2$-coated silicate platelets produced by the methods of the invention may be further incorporated into a polymer matrix to produce UV-shielding coatings for packaging UV sensitive food.

The present disclosure also relates to controllable surface reactions for uniformly coating metal oxides (e.g. $TiO_2$) onto the surface of substrate materials (e.g. hollow glass beads or silicate platelets), which may be easily adjusted and optimized for the loading of metal oxides and maximizing utilization of metal oxide precursors. The methods of the present disclosure advantageously allow for the development of metal oxides with controlled growth and dispersion on the surface of substrate materials which may be applied for reflective coating, antimicrobial coating and packaging applications.

The present disclosure further relates to a technology for uniformly coating metal oxides onto substrate surface through controlling surface reactions to produce hybrid functional materials for various applications. The method may comprise using substrate surface with —OH groups, using solvent at right concentrations to ensure that the metal oxide precursors exclusively migrate to the substrate surface and controlling surface reaction through tuning catalyst concentration. The method disclosed also provides for compositions of metal oxide-coated particles suitable for applying on surfaces of various curvatures for various applications such as light reflective hollow glass beads/$TiO_2$ for thermal insulating paint and UV-absorbent $TiO_2$/silicate sheet for UV shielding packaging etc. The invention disclosed herein may allow for uniform metal oxide-coating onto substrate surfaces, easily tunable loading of metal oxides, and maximized utilization of metal oxide precursors for low product cost, and no free-standing metal oxides formed in the system. The present invention may also provide for functionalization of substrate materials such as amorphous $TiO_2$-coated hollow glass beads for thermal insulating coating, amorphous/crystalline hybrid $TiO_2$-coated hollow glass beads for antimicrobial coating and platelet-like silicate sheet immobilized with $TiO_2$-particles, to be incorporated into polymer matrixes to produce UV-shielding coatings for packaging UV sensitive food.

The present invention further provides a method of depositing $TiO_2$ onto hollow glass beads with curved surfaces to create core-shell structures. The present invention also relates to a method of depositing $TiO_2$ onto silicate platelets with flat surfaces to create platelet-like structures immobilized with well-dispersed particles. The present invention further relates to a method of adjustable loading and maximizing yield of $TiO_2$ on the substrate surfaces. The methods of the present invention may provide a mixture with different ratios of crystalline/amorphous $TiO_2$ coated onto hollow glass beads with antimicrobial activity and at the same time may prevent the coating from decomposition which advantageously leads to longer shelf life.

The present invention also relates to a method of coating metal oxides onto the surface of substrate through controllable surface reactions, with the advantage of uniformly coating metal oxides onto the surface of substrate materials, easily tuning the loading of metal oxides and maximizing utilization of the metal oxide precursors. The hybrid functional materials could have a core-shell structure, a platelet-like structure or surfaces with other curvatures such as fibers. The method of the present invention may provide facile and controllable routes for uniformly coating metal oxides onto the substrate surface, easily tuning the loading of metal oxides and maximizing utilization of the metal oxide precursors.

BRIEF DESCRIPTION OF DRAWINGS

The accompanying drawings illustrate a disclosed embodiment and serves to explain the principles of the disclosed embodiment. It is to be understood, however, that the drawings are designed for purposes of illustration only, and not as a definition of the limits of the invention.

FIG. 1 is a series of scanning electron microscopy (SEM) images of (a) Hollow glass beads (HGBs) and (b)-(d) $TiO_2$-coated hollow glass beads: (b) HGBs@$TiO_2$ #1, (c) HGBs@$TiO_2$ #2 and (d) HGBs@$TiO_2$ #3 of Examples 1 to 3. Left and middle panels show samples at different magnifications. Right panel shows samples at the fractured interface.

FIG. 2 is a series of transmission electron microscopy (TEM) images of (a) $TiO_2$-coated silicate platelets at a scale of 0.5 μm, (b) $TiO_2$-coated silicate platelets at a scale of 0.2 μm and (c) $TiO_2$-coated silicate platelets at a scale of 20 nm of Example 5.

FIG. 3 is a series of ultraviolet-visible-near-infrared (UV-VIS-NIR) diffuse reflectance spectra of (a) HGBs, (b) HGB@$TiO_2$ #1, (c) HGB@$TiO_2$ #2 and (d) HGB@$TiO_2$ #3 of Examples 1 to 3.

FIG. 4 is a series of UV-VIS-NIR diffuse reflectance spectra of (a) HGB@$TiO_2$ #3 not thermally annealed, (b) HGB@$TiO_2$ #3 thermally annealed at 200° C. and (c) HGB@$TiO_2$ #3 of Examples 1 to 3 thermally annealed at 600° C.

EXAMPLES

Non-limiting examples of the invention and a comparative example will be further described in greater detail by reference to specific Examples and a Comparative Example, which should not be construed as in any way limiting the scope of the invention.

Materials

K25 hollow glass beads, obtained from 3M company of Minnesota of the United States of America.

Tetrabutyl titanate, obtained from Sigma Aldrich of St. Louis of Missouri of the United States of America.

Silicate platelets (montmorillonite), obtained from Nanocor Inc of Arlington Heights of Illinois of United States of America.

Example 1—Preparation of $TiO_2$-Coated HBGs@$TiO_2$ #1

2.4 g of K25 hollow glass beads were added to 72 mL of ethanol and shaken at 200 rpm at ambient temperature (25° C.) and neutral pH (pH of 7). 2.78 g of tetrabutyl titanate was added dropwise (0.5 g/min) into the hollow glass bead suspension under shaking. After 2 hours of shaking, 0.285 mL of tap water was added (0.2 g/min) to the suspension. The process was repeated by adding 0.285 mL of tap water for another 3 times at a time interval of 3 hours. It was further shaken for 12 hours. The suspension was filtered and the obtained wet powder was dried at room temperature. The powder was labelled as HGBs@$TiO_2$ #1.

Example 2—Preparation of $TiO_2$-Coated HGBs@$TiO_2$ #2

3.6 g of K25 hollow glass beads were added to 72 mL of ethanol and shaken at 200 rpm at ambient temperature (25° C.) and neutral pH (pH of 7). 2.78 g of tetrabutyl titanate was added dropwise (0.5 g/min) into the hollow glass bead suspension under shaking. After 2 hours of shaking, 0.285 mL of tap water was added (0.2 g/min) to the suspension. The process was repeated by adding 0.285 mL of tap water for another 5 times at a time interval of 3 hours. It was further shaken for 12 hours. The suspension was filtered and the obtained wet powder was dried at room temperature. The powder was labelled as HBGs@$TiO_2$ #2.

Example 3—Preparation of $TiO_2$-Coated HGBs@$TiO_2$ #3

4.8 g of K25 hollow glass beads were added to 72 mL of ethanol and shaken at 200 rpm at ambient temperature (25° C.) and neutral pH (pH of 7). 2.78 g of tetrabutyl titanate was added dropwise (0.5 g/min) into the hollow glass bead suspension under shaking. After 2 hours of shaking, 0.285 mL of tap water was added (0.2 g/min) to the suspension. The process was repeated by adding 0.285 mL of tap water for another 7 times at a time interval of 3 hours. It was further shaken for 12 hours. The suspension was filtered and the obtained wet powder was dried at room temperature. The powder was labelled as HGBs@$TiO_2$ #3.

Example 4-Preparation of Crystalline $TiO_2$-Coated HGBs 4.8 g of K25 hollow glass beads were added to 72 mL of ethanol and shaken at 200 rpm at ambient temperature (25° C.) and neutral pH (pH of 7). 2.78 g of tetrabutyl titanate was added dropwise (0.5 g/min) into the hollow glass bead suspension under shaking. After 2 hours of shaking, 0.285 mL of tap water was added (0.2 g/min) to the suspension. The process was repeated by adding 0.285 mL of tap water for another 7 times at a time interval of 3 hours. It was further shaken for 12 hours. The suspension was filtered and the obtained wet powder was dried at room temperature. An annealing process was applied to the $TiO_2$-coated hollow glass balls powder, typically at 200-1000° C. for 2 hours at a heating rate of 1° C. $min^{-1}$, to adjust the crystalline phase and crystallinity of $TiO_2$.

Example 5—Preparation of $TiO_2$-Coated Silicate Platelets 1.0 g of pristine silicate platelets (montmorillonite) was mixed with 25 mL of water and stirred overnight. To exchange water with ethanol, 120 mL of ethanol was added to the suspension. The suspension was homogenized using IKA T18 Basic Ultra Turrax homogenizer at 15,000 rpm for 5 minutes. Thereafter, the slurry precipitate was filtered with a Buchner funnel and washed with ethanol. The collected slurry precipitate was re-suspended into 120 mL of ethanol and homogenized for 5 minutes at 15,000 rpm, followed by filtration and washing. The process of re-suspension, homogenization, filtration and washing was repeated for another 2 times. The collected precipitate was re-suspended into 50 mL of ethanol and stirred under 300 rpm.

At ambient temperature (25° C.) and neutral pH (pH of 7), 2.33 g of tetrabutyl titanate was added dropwise (0.5 g/min) into the suspension under stirring. After 5 minutes of stirring, 0.285 mL of deionised water was added (0.2 g/min) to the suspension. The process was repeated by adding 0.285 mL of deionised water for another 3 times at a time interval of 1 hour. The suspension was filtered, washed with ethanol and dried at room temperature.

Example 6—Characterization and Performance Test of Sample

Scanning electron microscopy (SEM, JEOL, JSM-6700F) was used to measure the morphology of $TiO_2$-coated hollow glass beads and the thickness of $TiO_2$ shell. Transmission electron microscopy (TEM, JEOL JEM-2010F, 200 kV) was used to study the morphology of $TiO_2$-coated silicate platelets. Inductively coupled plasma-atomic emission spectroscopy (ICP-AES) was used to measure the $TiO_2$ content in $TiO_2$-coated hollow glass beads. UV-VIS-NIR spectrophotometer UV-3600 (Shimadzu) with integrating sphere ISR 3100 was used to measure the diffuse solar reflectance.

FIG. 1 shows the SEM images of (a) hollow glass beads and (b)-(d) the corresponding hollow glass beads after $TiO_2$ coating of Examples 1-3, at different magnification, including the cross-sectional view.

FIG. 2 shows the TEM images of $TiO_2$-coated silicate platelets after $TiO_2$ coating of Example 5 at different magnifications.

The surface curvature of substrate materials may affect the morphology of the metal oxide formed. For instance, the deposition of $TiO_2$ onto hollow glass beads with curved surfaces to create core-shell structures (FIG. 1), and the deposition of $TiO_2$ onto silicate platelets with flat surfaces to create platelet-like structures immobilized with metal oxide particles (FIG. 2).

FIG. 1 shows SEM images of the $TiO_2$-coated hollow glass beads. It reveals good integrity of hollow glass beads in all products. A broken sphere provides further insight into the core-shell structure of the products (FIG. 1, right panel) where the hollow glass bead core is homogenously covered by a $TiO_2$ shell with micro-crack structures. FIG. 1 also shows that using the method as disclosed herein for $TiO_2$-coating results in a coating of $TiO_2$ exclusively deposited onto the surface of hollow glass beads without the disadvantageous presence of freestanding $TiO_2$ particles. This also contributes to high yield of $TiO_2$.

FIG. 2 shows TEM images of $TiO_2$-coated silicate platelets. FIG. 2 shows that $TiO_2$ particles are well-dispersed as a ring-shaped coating around the surface of silicate particles. The $TiO_2$-coated silicate platelets have a coating thickness of about 20 nm and a titania yield above 90%.

The right panel of FIG. 1 shows the cross-sectional SEM images of (a) hollow glass beads and (b)-(d) the corresponding hollow glass beads after $TiO_2$ coating as mentioned in Examples 1-3. The thickness of the $TiO_2$-coating layer is about 200 nm in FIG. 1b, about 150 nm in FIG. 1c and about 100 nm in FIG. 1d. The results also show that the thickness of the $TiO_2$-coatings decreases from 200 nm to 100 nm as the ratio of titania precursor to hollow glass beads decreases from 3.36:1 to 1.68:1 (mmol/g).

FIG. 3 shows the UV-VIS-NIR diffuse reflectance spectra of (a) hollow glass beads and (b)-(d) the corresponding hollow glass beads after $TiO_2$ coating of Examples 1-3. An obvious red shift of diffuse reflectance spectra of the $TiO_2$-coated hollow glass beads is observed in the region of 200-400 nm, when compared with the spectra of the original hollow glass beads, which further confirms the presence of $TiO_2$-coating.

Table 1 below shows the preparation conditions, thickness of $TiO_2$ shell, $TiO_2$ yield and diffuse solar reflectance of $TiO_2$-coated hollow glass beads. The results show that the $TiO_2$-coated hollow glass bead samples prepared with a lower ratio of $TiO_2$ precursor to hollow glass beads at about 1.68:1 (mmol/g) has a reduced thickness in $TiO_2$-coating but comparable diffuse solar reflectance compared to the samples prepared with a higher ratio of $TiO_2$ precursor to hollow glass beads at about 2.24:1 or 3.36:1 (mmol/g). Therefore, a lower ratio of $TiO_2$ precursor to hollow glass beads at about 1.68:1 (mmol/g) is favourable for preparation of $TiO_2$-coated hollow glass bead considering the utilization of $TiO_2$ precursor, production cost and the diffusive solar light reflectance performance.

The loading of metal oxides on the substrate materials can be controlled by adjusting the amount of the substrate materials in the surface reactions. The results in FIG. 1 and Table 1 show that when the mass ratio of hollow glass beads to organic solvent increases from 0.04:1 (HGB@$TiO_2$ #1) to 0.06:1 (HGB@$TiO_2$ #2) and then to 0.08:1 (HGB@$TiO_2$ #3), the thickness of the $TiO_2$ shell decreases from 200 nm to 100 nm, while the samples still maintained comparable reflective performance.

FIG. 3 and Table 1 show that the diffuse solar light reflectance of HGB@$TiO_2$ #1-3 is comparable and is not affected by the reduction of the shell thickness. As a result, there should be an optimized level of the $TiO_2$ content to hollow glass beads, above which the diffuse solar light reflectance will not be further improved. This is crucial for determining the suitable ratio between the metal oxides and the substrate materials in the surface reactions and maximizing the performance and cost-saving potential.

Table 1 shows that the $TiO_2$ yield obtained for HGB@$TiO_2$ #1-3 is above 90%. This may be ascribed to two mechanisms. Firstly, a sufficiently high amount of hollow glass beads was added in the suspension to provide a large contact surface area with the other reactants. This allows the yield of the metal oxides to be maximized and result in a high metal oxides yield. Secondly, catalyst was added at predetermined time intervals. The controlled addition of water enables exclusive deposition of metal oxide on the substrate surface and further contributes to the high $TiO_2$ yield.

TABLE 1

Preparation conditions, thickness of $TiO_2$ shell, $TiO_2$ yield and diffuse solar reflectance of $TiO_2$-coated hollow glass beads.

| Sample | Ratio of titania precursor to hollow glass bead (mmol/g) | Ratio of hollow glass bead to organic solvent (g/g) | Thickness of $TiO_2$ shell (nm) | $TiO_2$ yield (by mass) (%) | $TiO_2$ yield (by ICP) (%) | Diffuse solar reflectance (%) |
|---|---|---|---|---|---|---|
| HGB | — | — | — | — | — | 84.1 |
| HGB@$TiO_2$#1 | 3.36:1 | 0.04 | 200 | 97.0 | 70.8 | 89.9 |
| HGB@$TiO_2$#2 | 2.24:1 | 0.06 | 150 | 98.3 | 83.1 | 87.5 |
| HGB@$TiO_2$#3 | 1.68:1 | 0.08 | 100 | 91.9 | 77.7 | 88.9 |

FIG. 4 shows the UV-VIS-NIR diffuse reflectance spectra of HGB@$TiO_2$ #3 thermally annealed at different temperatures, (a) HGB@$TiO_2$ #3 not thermally annealed, (b) HGB@$TiO_2$ #3 thermally annealed at 200° C. and (c) HGB@$TiO_2$ #3 thermally annealed at 600° C. as mentioned in Example 4. $TiO_2$ has different crystalline phases. Rutile $TiO_2$ has the highest refractive index (~2.73), followed by brookite $TiO_2$ (~2.58), anatase $TiO_2$ (~2.55) and amorphous $TiO_2$ (~2.45). A high refractive index would improve the solar light reflectance. Due to the high refractive index of crystalline $TiO_2$, the reflectance in both the NIR and the visible regions is obviously increased with temperature. However, the reflectance in the ultraviolet region decreases, which could be ascribed to the strong ultraviolet absorbance of crystalline $TiO_2$. Crystalline $TiO_2$ exhibits high refractive index and strong ultraviolet absorbance. Thermal annealing at elevated temperature increases the proportion of crystalline $TiO_2$, which may lead to increasing reflectance in both the near-infrared radiation and the visible regions while decreasing the reflectance in the ultraviolet region. The total solar reflectance increases as a combination of these two effects. The results show an improvement in total solar reflectance for samples thermally annealed at 200° C. or 600° C.

Crystalline $TiO_2$ is known to inactivate microorganisms and exhibit excellent photocatalytic antimicrobial activity. The crystalline $TiO_2$-coated hollow glass beads can thus be applied in antimicrobial coatings with the use of natural sunlight as an excitation source. A mixture with different ratios of crystalline $TiO_2$ phases and crystallinity can be easily produced through thermal annealing of the $TiO_2$-coated hollow glass beads. This method may be used to prepare mixtures of crystalline phases that are more active than single crystalline phase alone and at the same time offers longer shelf-life by preventing the coating from decomposition. Such mixtures could also be produced through mixing thermally and non-thermally treated $TiO_2$-coated hollow glass beads at specific ratios.

Table 2 below shows the calculated diffuse solar reflectance of HGB@$TiO_2$ #3 thermally annealed at different temperatures based on the data presented in FIG. 4. The results show that the $TiO_2$-coated HGBs samples prepared with thermal annealing shows an improvement in diffuse solar reflectance over a broad spectrum including total, ultra-violet, visible and near-infrared radiation ranges. Table 2 also shows that samples that were thermally annealed at higher temperature of 600° C. results in a greater improvement in diffuse solar reflectance compared to samples that were thermally annealed at temperature of 200° C.

TABLE 2

Diffuse solar reflectance of HGB@$TiO_2$#3 not thermally annealed, HGB@$TiO_2$#3 thermally annealed at 200° C. and HGB@$TiO_2$#3 thermally annealed at 600° C.

| Sample | Diffuse solar reflectance (%) | | | |
|---|---|---|---|---|
| | Total | Ultraviolet | Visible | Near-infrared radiation |
| HGB@$TiO_2$#3 | 88.9 | 64.8 | 89.4 | 89.6 |
| HGB@$TiO_2$#3_200° C. | 89.7 | 63.9 | 89.3 | 91.2 |
| HGB@$TiO_2$#3_600° C. | 90.8 | 54.5 | 90.3 | 92.7 |

Comparative Example 0.6 g of K25 hollow glass balls were added to 72 mL of ethanol (technical grade) and shaken at 200 rpm. 2.78 g of tetrabutyl titanate was added dropwise into the hollow glass ball suspension under shaking. After 2 hours of shaking, 0.285 mL of tap water was added to the suspension. It was shaken for another 2 hours. The suspension was filtered and the obtained wet powder was dried at room temperature. The powder was labelled as Comparative Example 1.

The $TiO_2$-coated hollow glass beads of Examples 1 to 3 were compared against Comparative Example 1. As discussed in Examples 1 to 3 and as shown below in Table 3, the present invention uses different ranges of i) ratio of titania precursor to hollow glass bead and ii) ratio of water to titania precursor, as compared to Comparative Example 1.

Comparative Example 1 uses a ratio of 13.45:1 of titania precursor to hollow glass bead, whereas the present invention uses a ratio in the range of 1:1 to 7:1 (mmol/g) which is lower than that of Comparative Example 1. The use of a lower ratio of titania precursor to inorganic particles as disclosed in the present examples offers an unexpected technical effect of improved $TiO_2$ yield, as compared to Comparative Example 1. It was surprisingly found that the lower ratio of titania precursor to inorganic particles enables sufficient inorganic particle surface area to be exposed to the reactants and hence maximizing the yield of titania.

Comparative Example 1 uses a ratio of 2:1 of catalyst to titania precursor, whereas the present invention uses a ratio in the range of 9:1 to 16:1 which is higher than that of Comparative Example 1 and which advantageously leads to higher yield of titania (as shown in Table 3 below).

Comparative Example 1 only uses one addition of catalyst, whereas the present invention discloses the multiple additions of catalyst at predetermined time intervals which advantageously control the concentration of catalyst in the system and avoids the growth of free-standing titania.

TABLE 3

Comparison with Comparative Example 1

| Sample | Examples | Ratio of titania precursor to hollow glass bead (mmol/g) | Ratio of water to titania precursor (mol/mol) | Thickness of $TiO_2$ shell (nm) | $TiO_2$ yield (by mass) (%) | $TiO_2$ yield (by ICP) (%) | Diffuse solar reflectance (%) |
|---|---|---|---|---|---|---|---|
| Comparative Example 1 | #Comparative Example 1 | 13.45:1 | 2:1 | 450 | 61.9 | 37.0 | 88.8 |
| Examples 1 to 3 | #1 | 3.36:1 | 9:1 | 200 | 97.0 | 70.8 | 89.9 |
| | #2 | 2.24:1 | 12:1 | 150 | 98.3 | 83.1 | 87.5 |
| | #3 | 1.68:1 | 16:1 | 100 | 91.9 | 77.7 | 88.9 |

INDUSTRIAL APPLICABILITY

The disclosed method may be able to form $TiO_2$-coated inorganic particles that are used in reflective coatings for thermal insulation applications, antimicrobial coatings or UV-shielding for packing applications. The $TiO_2$-coated inorganic particles may be used in coatings to impart desired properties such as high solar light reflectance at low production cost due to the uniformity in coating and maximized utilization of $TiO_2$ precursors.

The disclosed method may circumvent the problem of non-uniform coating, low yield and high production cost. The disclosed method may avoid the problem of freestanding agglomerates of $TiO_2$ particles. The disclosed method may control the thickness and yield of $TiO_2$ coating formation by controlling the ratio between the $TiO_2$ precursor, inorganic particles, catalyst and organic solvent. The disclosed method may not require the use of pH control or temperature control. The disclosed method may not require the use of surface modification, coupling agent, precipitator or surfactant.

Through controllable surface reactions, $TiO_2$ particles can be uniformly dispersed on the surface of silicate platelets. There is no need to make any surface modification of silicate substrates. It overcomes the agglomeration problem of nanoscale $TiO_2$ when dispersed in the matrix materials, where nanoscale $TiO_2$ is typically prone to aggregate due to the large surface area and high surface energy of nanoparticles. The $TiO_2$-coated silicate platelets can be further incorporated into polymer matrix to produce UV-shielding coatings for packaging UV sensitive food. This invention discloses controllable surface reactions for uniformly coating metal oxides (e.g. $TiO_2$) onto the surface of substrate materials (e.g. hollow glass beads and silicate platelets), easily adjusting and optimizing the loading of metal oxides and maximizing utilization of the metal oxide precursors. It offers new opportunities for developing metal oxides with controlled growth and dispersion on the surface of the substrate materials which can be applied for reflective coating, antimicrobial coating and packaging applications.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

The invention claimed is:

1. A titania-coated particle produced by a method comprising steps of:
   (a) agitating a mixture of inorganic particle and organic solvent;
   (b) adding titania precursor dropwise into the mixture of step (a) under agitation; and
   (c) adding catalyst to the mixture of step (b) two or more times at predetermined time intervals, wherein each time interval is at least 0.5 hours apart, thereby converting said titania precursor to titania which then forms a coating on said inorganic particle;
wherein steps (a) to (c) are performed at neutral pH and ambient temperature.

2. A reflective coating for thermal insulation, an antimicrobial coating, or UV shielding for packing applications comprising a titania-coated particle according to claim 1.

* * * * *